(12) United States Patent
Takahashi

(10) Patent No.: US 8,244,027 B2
(45) Date of Patent: Aug. 14, 2012

(54) VEHICLE ENVIRONMENT RECOGNITION SYSTEM

(75) Inventor: Yasushi Takahashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 777 days.

(21) Appl. No.: 12/320,352

(22) Filed: Jan. 23, 2009

(65) Prior Publication Data
US 2009/0190800 A1 Jul. 30, 2009

(30) Foreign Application Priority Data

Jan. 25, 2008 (JP) ................................. 2008-014552

(51) Int. Cl.
*G06K 9/00* (2006.01)
*G06K 9/32* (2006.01)
*G01B 9/02* (2006.01)
(52) U.S. Cl. ........ 382/154; 382/106; 382/104; 382/103; 382/294; 356/482; 359/462
(58) Field of Classification Search .................. 382/106, 382/100, 287, 103, 104, 155, 294, 154; 359/462; 356/482; 348/340
See application file for complete search history.

(56) References Cited

U.S. PATENT DOCUMENTS

| | | | | |
|---|---|---|---|---|
| 5,304,980 | A * | 4/1994 | Maekawa | 340/435 |
| 5,410,346 | A | 4/1995 | Saneyoshi et al. | |
| 5,519,618 | A * | 5/1996 | Kastner et al. | 701/120 |
| 5,529,139 | A * | 6/1996 | Kurahashi et al. | 180/169 |
| 5,611,406 | A * | 3/1997 | Matsuzaki et al. | 180/167 |
| 6,215,898 | B1 * | 4/2001 | Woodfill et al. | 382/154 |
| 6,370,261 | B1 * | 4/2002 | Hanawa | 382/104 |
| 6,477,260 | B1 * | 11/2002 | Shimomura | 382/106 |
| 6,487,304 | B1 * | 11/2002 | Szeliski | 382/107 |
| 6,594,378 | B1 * | 7/2003 | Li et al. | 382/128 |
| 6,690,451 | B1 * | 2/2004 | Schubert | 356/3.14 |
| 6,714,672 | B1 * | 3/2004 | Berestov et al. | 382/154 |
| 6,909,802 | B2 * | 6/2005 | Nakamura | 382/154 |
| 6,990,216 | B2 * | 1/2006 | Yamamura | 382/106 |
| 7,376,247 | B2 * | 5/2008 | Ohta et al. | 382/103 |
| 7,526,120 | B2 * | 4/2009 | Gokturk et al. | 382/154 |
| 7,756,299 | B2 * | 7/2010 | Higaki | 382/106 |
| 7,924,316 | B2 * | 4/2011 | Silverstein et al. | 348/208.4 |
| 7,966,327 | B2 * | 6/2011 | Li et al. | 707/737 |
| 8,045,782 | B2 * | 10/2011 | Li et al. | 382/133 |

(Continued)

FOREIGN PATENT DOCUMENTS

JP 5-114099 5/1993

(Continued)

*Primary Examiner* — Chan S Park
*Assistant Examiner* — Avinash J Yentrapati
(74) *Attorney, Agent, or Firm* — Smith, Gambrell & Russell, LLP

(57) ABSTRACT

A vehicle environment recognition system includes stereo-image taking means for taking images of an environment around a subject vehicle and for outputting the images as a reference image and a comparative image, first stereo matching means for forming a first distance image on the basis of the reference image and the comparative image or on the basis of two images obtained by preprocessing the reference image and the comparative image, second stereo matching means for forming a second distance image on the basis of two images obtained by preprocessing the reference image and the comparative image in a different manner, detection means for detecting objects in the reference image on the basis of the first and second distance images, and selection means for selecting one of the results of detection based on the first and second distance images.

8 Claims, 13 Drawing Sheets

U.S. PATENT DOCUMENTS

| | | | |
|---|---|---|---|
| 8,147,503 B2* | 4/2012 | Zhao et al. | 606/130 |
| 2002/0024517 A1* | 2/2002 | Yamaguchi et al. | 345/424 |
| 2003/0091225 A1* | 5/2003 | Chen | 382/145 |
| 2003/0160866 A1* | 8/2003 | Hori et al. | 348/116 |
| 2003/0185421 A1* | 10/2003 | Okamoto et al. | 382/104 |
| 2004/0101162 A1* | 5/2004 | Higaki et al. | 382/103 |
| 2004/0151396 A1* | 8/2004 | Nomura et al. | 382/254 |
| 2005/0047656 A1* | 3/2005 | Luo et al. | 382/167 |
| 2005/0105765 A1* | 5/2005 | Han et al. | 382/100 |
| 2005/0117781 A1* | 6/2005 | Aoyama | 382/103 |
| 2006/0171566 A1* | 8/2006 | Gindele et al. | 382/106 |
| 2006/0212215 A1* | 9/2006 | Koulinitch | 701/205 |
| 2006/0227862 A1* | 10/2006 | Campbell et al. | 375/240 |
| 2006/0239537 A1* | 10/2006 | Shragai et al. | 382/154 |
| 2007/0110289 A1* | 5/2007 | Fu et al. | 382/128 |
| 2008/0089557 A1* | 4/2008 | Iwaki et al. | 382/106 |
| 2008/0107306 A1* | 5/2008 | Matsuzawa | 382/106 |
| 2008/0117093 A1* | 5/2008 | Ichiyanagi et al. | 342/104 |
| 2008/0253617 A1* | 10/2008 | Ernst et al. | 382/106 |
| 2008/0298719 A1* | 12/2008 | Sengupta et al. | 382/294 |
| 2009/0060256 A1* | 3/2009 | White et al. | 382/100 |
| 2009/0060280 A1* | 3/2009 | Choi et al. | 382/106 |
| 2009/0067728 A1* | 3/2009 | Mishima et al. | 382/218 |
| 2009/0136091 A1* | 5/2009 | Woodfill et al. | 382/106 |
| 2009/0154566 A1* | 6/2009 | Kondo et al. | 375/240.16 |
| 2009/0190827 A1* | 7/2009 | Saito | 382/154 |
| 2010/0020074 A1* | 1/2010 | Taborowski et al. | 345/420 |

FOREIGN PATENT DOCUMENTS

| | | |
|---|---|---|
| JP | 5-265547 | 10/1993 |
| JP | 6-266828 | 9/1994 |
| JP | 10-283461 | 10/1998 |
| JP | 10-283477 | 10/1998 |
| JP | 2001-43377 | 2/2001 |
| JP | 2003-255430 | 9/2003 |
| JP | 2004226197 A * | 8/2004 |
| JP | 2006-72495 | 3/2006 |
| JP | 2009133753 A * | 6/2009 |

* cited by examiner

TE₀

TE₀

$T_z2$

SECTION Dn    $T_z$ $T_0$ $T_c$ $T_z(T_z1)$

VEHICLE ENVIRONMENT RECOGNITION SYSTEM

CROSS-REFERENCE TO RELATED APPLICATIONS

The disclosure of Japanese Patent Application No. 2008-014552 filed on Jan. 25, 2008 including the specification, drawings and abstract is incorporated herein by reference in its entirety.

BACKGROUND OF THE INVENTION

1. Field of the Invention

The present invention relates to vehicle environment recognition systems, and more particularly, to a vehicle environment recognition system that recognizes an environment by stereo matching of two images that are taken by stereo-image taking means installed in a vehicle.

2. Description of the Related Art

In general, in order to measure the distance to an object with a stereo camera, a pair of images are taken by a pair of right and left cameras that are mounted at the same height, and one of the taken images used for reference (hereinafter referred to as a reference image $T_0$) is compared with the other image (hereinafter referred to as a comparative image $T_c$). By comparison, a difference between corresponding positions of the same object in the images, that is, a parallax is calculated, and the distance to the object is calculated from the parallax. The positions in the reference image and the comparative image where an image of the same object is taken are typically located by stereo matching (for example, see Japanese Unexamined Patent Application Publication No. 5-114099).

In stereo matching, as shown in FIG. 17, a reference image $T_0$ is divided into small regions (hereinafter referred to as reference pixel blocks $PB_0$) defined by a predetermined number of pixels, such as 3 by 3 pixels or 4 by 4 pixels. An epipolar line EPL is set in the vertical position in the comparative image $T_c$ corresponding to each reference pixel block $PB_0$, and a brightness pattern of each reference pixel block $PB_0$ is compared with a brightness pattern of each comparative pixel block $PB_c$ that exists on the epipolar line EPL and that has the same shape as that of the reference pixel block $PB_0$.

In this case, for example, a SAD (Sum of Absolute Difference) value is calculated as a difference in the brightness pattern according to the following Expression (1):

$$SAD = \sum_{s,t} |p1s, t - p2s, t| \quad (1)$$

where p1s,t represents the brightness of the pixel in the reference pixel block $PB_0$ in the reference image $T_0$, and p2s,t represents the brightness of the pixel in the comparative pixel block $PB_c$ in the comparative image $T_c$.

In Expression (1) described above, for example, a SAD value is calculated for all pixels in a region where $1 \leq s \leq 3$ and $1 \leq t \leq 3$ when each of the reference pixel block $PB_0$ and the comparative pixel block $PB_c$ is set as a region defined by 3 by 3 pixels, and for all pixels in a region where $1 \leq s \leq 4$ and $1 \leq t \leq 4$ when each of the reference pixel block $PB_0$ and the comparative pixel block $PB_c$ is set as a region defined by 4 by 4 pixels.

Of SAD values that are calculated according to Expression (1) and that are less than or equal to a preset threshold value, a comparative pixel block $PB_c$ that provides the minimum SAD value is specified as a comparative pixel block in the comparative image $T_c$ that includes an image of the same object as that included in the reference pixel block $PB_0$. Using the result of stereo matching, a parallax dp between the comparative pixel block $PB_c$ specified in the comparative image $T_c$ and the original reference pixel block $PB_0$ in the reference image $T_0$ is calculated, and the distance Z to the object at the reference pixel block $PB_0$ is calculated on the basis of the parallax dp according to the principle of triangulation.

FIGS. 18A and 18B partly illustrate a reference image $T_0$ and a comparative image $T_c$, respectively. The reference image $T_0$ and the comparative image $T_c$ are images of a preceding vehicle traveling in front of a subject vehicle that are taken by stereo cameras mounted in a subject vehicle in a backlit condition. In this case, backlight enters a camera for taking the reference image $T_0$, and the reference image $T_0$ is whitish as a whole. In contrast, backlight is blocked by some object (in this case, a building that is not shown), but does not enter a camera for taking the comparative image $T_c$. Therefore, the comparative image $T_c$ is dark as a whole.

When the brightness balance between a pair of cameras is thus disturbed, a difference increases between the brightness p1s,t of the pixel in the pixel block $PB_0$ in the reference image $T_0$ and the brightness p2s,t of the pixel in the pixel block $PB_c$ in the comparative image $T_c$ in Expression (1) described above. Therefore, the SAD value calculated according to Expression (1) increases, and is sometimes not less than or equal to the above-described threshold value. In this case, a pixel block $PB_c$ corresponding to a pixel block $PB_0$ in the reference image $T_0$ cannot be specified in the comparative image $T_c$.

For this reason, data image shown in FIG. 19 is formed by assigning calculated parallaxes dp to the pixel blocks $PB_0$ in the reference image $T_0$ (hereinafter referred to as a distance image $T_z$), and little information about the parallaxes dp of the preceding vehicle are obtained. In the distance image $T_z$ shown in FIG. 19, pixel blocks, whose parallax dp is not calculated because the SAD value is not less than or equal to the threshold value, show white.

For example, when effective information about the parallaxes dp of the preceding vehicle and information about the distances Z to the preceding vehicle calculated from the parallaxes dp are thus not obtained by stereo matching, that is, when the preceding vehicle is lost, it is impossible to effectively perform automatic follow-up control with respect to the preceding vehicle.

In this respect, Japanese Unexamined Patent Application Publication Nos. 2001-43377 and 2003-255430 propose a technique in which it is determined whether or not a taken image is proper, or recognition control of the preceding vehicle is interrupted when the taken image is not proper. However, these publications do not state how recognition of the preceding vehicle is continued in such a situation.

If a preceding vehicle serving as an object to be recognized is lost, it may be automatically determined that no preceding vehicle exists, and the subject vehicle may collide with the preceding vehicle in the worst case. While the object to be recognized is not limited to a preceding vehicle in the present invention, there is a demand to develop a technique of effectively recognizing an environment around the subject vehicle by image processing even when the brightness balance between a pair of cameras in the stereo camera is disturbed, as described above.

SUMMARY OF THE INVENTION

The present invention has been made in view of these circumstances, and an object of the invention is to provide a vehicle environment recognition system that can recognize an environment around a subject vehicle by effectively performing stereo matching even when the brightness balance between a pair of cameras is disturbed.

In order to solve the above-described problems, a vehicle environment recognition system according to an aspect of the present invention includes stereo-image taking means for simultaneously taking images of an environment around a subject vehicle with a pair of cameras and for outputting the images as a reference image and a comparative image; first stereo matching means for calculating first parallaxes or first distances by stereo matching based on the reference image and the comparative image or based on two images formed by subjecting the reference image and the comparative image to a predetermined first preprocessing operation, and for forming a first distance image by assigning the calculated first parallaxes or first distances to pixel blocks in the reference image; second matching means for calculating second parallaxes or second distances by stereo matching based on two images formed by subjecting the reference image and the comparative image to a predetermined second preprocessing operation different from the first preprocessing operation, and for forming a second distance image by assigning the calculated second parallaxes or second distances to the pixel blocks in the reference image; detection means for detecting objects in the reference image on the basis of the first distance image and the second distance image; and selection means for selecting one of a result of detection of the objects based on the first distance image and a result of detection of the objects based on the second distance image.

In this case, when an environment around a subject vehicle is recognized by detecting objects in the reference image, two stereo matching means, that is, the means for forming a first distance image by stereo matching based on the reference image and the comparative image or two images formed by subjecting the reference image and the comparative image to a predetermined first preprocessing and the means for forming a second distance image by stereo matching means based on two images that are formed by subjecting the reference image and the comparative image to a predetermined second preprocessing different from the first preprocessing, are provided. On the basis of the first and second distance images formed by the different means, objects, such as a preceding vehicle, are detected. The selection means selects a proper detection result.

For this reason, in a case in which a reference image shown in FIG. 18A and a comparative image shown in FIG. 18B are used, even in an environment where objects, such as a preceding vehicle, cannot be detected because the brightness balance between a pair of cameras is disturbed, objects can be accurately detected and the environment around the subject vehicle can be reliably recognized by using the distance images that are obtained by different preprocessing operations and effective stereo matching with the different stereo matching means.

Hence, even in an environment where backlight enters only one of the cameras, detection can be continued without losing the preceding vehicle. This allows effective automatic follow-up control with respect to the preceding vehicle.

Preferably, the selection means performs the selection on the basis of a specific object of the objects detected in the reference image by the detection means.

In this case, in addition to the above-described advantages, since selection is performed on the basis of a specific object, such as a preceding vehicle, of the objects detected in the reference image by the detection means, the specific object can be accurately detected without being lost.

Preferably, the selection means compares a current lateral width of the specific object detected in a current object detection result with a previous lateral width of the specific object calculated on the basis of the object detection result selected in previous object detection, and rejects the current detection result when the current lateral width is smaller by at least a first predetermined threshold value than the previous lateral width.

In this case, in addition to the above-described advantages, when the above condition is satisfied and the currently detected lateral width of the object is smaller than the previously detected lateral width of the object, the current detection result is rejected. Consequently, it is possible to detect the object without depending on the detection result having low reliability, and to enhance the reliability of stereo matching of the vehicle environment recognition system and of information about the object detected by stereo matching.

Preferably, the selection means compares a current distance between the specific object and the subject vehicle that is detected in a current object detection result with a previous distance between the specific object and the subject vehicle that is calculated on the basis of the object detection result selected in previous object detection, and rejects the current object detection result when the current distance is different by at least a predetermined second threshold value from the previous distance.

In this case, when the above condition is satisfied and the currently detected distance between the object and the subject vehicle is pronouncedly different from the previously detected distance between the object and the subject vehicle, the current detection result is rejected. Consequently, it is possible to detect the object without depending on the detection result having low reliability, and to enhance the reliability of stereo matching of the vehicle environment recognition system and of information about the object detected by stereo matching.

Preferably, the selection means rejects both of the object detection result based on the first distance image and the object detection result based on the second distance image when the specific object is detected in one of the object detection results, and is not detected in the other object detection result at a detecting position in the reference image where the object is detected in the one detection result, and when the number of data on the first or second parallaxes or the first or second distances existing at the detecting position of the specific object in the first or second distance image in the one object detection result is less than a predetermined third threshold value.

In this case, when the above condition is satisfied, when an object is detected in one of the detection results and is not detected at a position in the reference image in the other detection result where the object is detected in the one detection result, and when the number of data on effective parallaxes or the like existing at the detecting position of the object in the distance image is small in the one detection result, even if the object is detected in the one detection result in such a situation, it is thought that reliability of information about the detected object is low. For this reason, in this case, the detection result having low reliability is not output, but both detection results are rejected. Thus, the reliability of stereo matching of the vehicle environment recognition system and of information about the object detected by stereo matching cab be enhanced, and the above-described advantages of the present invention are achieved properly.

Preferably, the first stereo matching means forms the first distance image by performing the stereo matching based on the reference image and the comparative image, and the second stereo matching means forms the second distance image by performing the stereo matching based on two images that are formed by subjecting the reference image and the comparative image to edge detection.

In this case, the first stereo matching means forms the first distance image by stereo matching based on the reference image and the comparative image, and the second stereo matching means forms the second distance image by stereo matching based on the reference image and the comparative image after the reference image and the comparative image are subjected to edge detection. Therefore, for example, a reference image $T_0$ shown in FIG. 18A and a comparative image $T_c$ shown in FIG. 18B are used, even in an environment where an object, such as a preceding vehicle, cannot be detected because of the brightness balance between a pair of cameras is disturbed, the object can be accurately detected, the environment around the subjected vehicle can be reliably recognized, and the above-described advantages of the present invention can be achieved properly.

Preferably, the selection means rejects the object detection result based on the first distance image when a distance between the specific object and the subject vehicle calculated on the basis of the first distance image is less than a distance between the specific object and the subject vehicle calculated on the basis of the second distance image, when the number of data on the first parallaxes or first distances at a detecting position of the specific object in the first distance image is less than a predetermined fourth threshold value, and when the number of data on the second parallaxes or second distances at a detecting position of the specific object in the second distance image is more than a predetermined fifth threshold value.

In this case, when the above condition is satisfied, the object detection result based on the first distance image formed on the basis of the reference image and the comparative image is rejected. Therefore, after it is confirmed that the object detection result based on the first distance image is wrong, the object detection result is rejected, and the object can be detected without depending on the detection result having low reliability. Thus, the reliability of stereo matching of the vehicle environment recognition system and of information about the object detected by stereo matching can be enhanced, and the above-described advantages of the present invention can be achieved properly.

Preferably, when none of the object detection result based on the first distance image and the object detection result based on the second distance image are rejected, the selection means rejects one of the object detection results including a smaller number of data on the first or second parallaxes or the first or second distances at a position where the specific object in the first distance image or the second distance image is detected.

In this case, when the above conditions are satisfied and none of the object detection result based on the first distance image and the object detection result based on the second distance image are rejected, one of the detection results having a smaller number of effective data is rejected, and the other detection result having a larger number of effective data is adopted. Thus, the effectiveness and reliability of stereo matching of the vehicle environment recognition system and of information about the object detected by stereo matching can be enhanced, and the above-described advantages of the present invention can be achieved properly.

DESCRIPTION OF THE PREFERRED EMBODIMENTS

A vehicle environment recognition system according to an embodiment of the present invention will be described below with reference to the drawings.

The following description will be given of a case in which the vehicle environment recognition system recognizes a preceding vehicle. However, an object to be recognized is not limited to the preceding vehicle, and other vehicles, pedestrians, obstacles, or all of them can be recognized.

Figure 1:
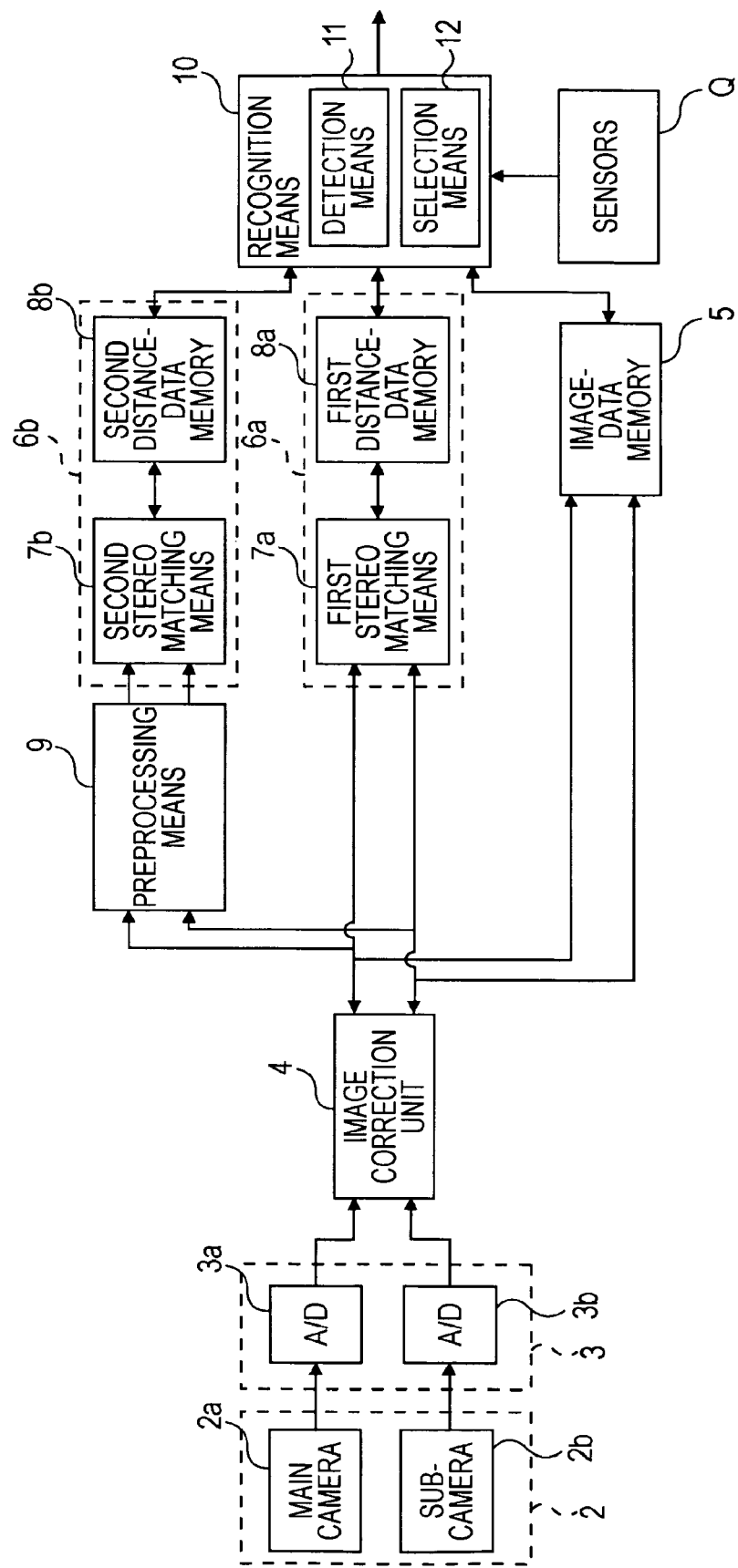
FIG. 1 is a block diagram showing a configuration of a vehicle environment recognition system according to an embodiment.

Referring to FIG. 1, a vehicle environment recognition system 1 according to the embodiment includes a stereo-image taking means 2, a conversion means 3, and a recognition means 10. The vehicle environment recognition system 1 also includes two image processing means 6a and 6b.

The configuration including the stereo-image taking means 2, the conversion means 3, an image correction unit 4, an image-data memory 4, and first and second image processing means 6a and 6b respectively having first and second stereo matching means 7a and 7b and first and second distance-data memories 8a and 8b has been described in detail in Japanese Unexamined Patent Application Publication Nos. 5-114099, 5-265547, 6-266828, 10-283461, 10-283477, and 2006-72495 filed earlier by the present applicant. Therefore, the configuration will be briefly described below.

In this embodiment, the stereo-image taking means 2 is formed by a stereo camera including a main camera 2a and a sub-camera 2b mounted on an vehicle-interior side of the front glass. The main camera 2a and the sub-camera 2b are spaced a predetermined distance apart in the vehicle width direction, that is, in the right-left direction. The main camera 2a and the sub-camera 2b respectively include image sensors, such as CCDs or CMOS sensors, which are in synchronization with each other.

The main camera 2a and the sub-camera 2b are mounted at the same height from the road surface, simultaneously take images of the surroundings of the subject vehicle at a predetermined sampling cycle, and output information about the taken images. The main camera 2a close to the driver outputs image data on a reference image $T_0$ illustrated in FIG. 2, and the sub-camera 2b remote from the driver outputs image data on a comparative image $T_c$ that is not shown.

Image data output from the main camera 2a and the sub-camera 2b is converted from analog images into digital images, in which each pixel has a predetermined number of levels of brightness, for example, 256 levels, by A/D converters 3a and 3b in the conversion means 3. The digital images are subjected to image correction, such as displacement and noise removal, by the image correction unit 4. After image correction, the image data is stored in the image-data memory 5, and is also transmitted to the first image processing means 6a and the second image processing means 6b.

The first image processing means 6a includes the first stereo matching means 7a, such as an image processor, and the first distance-data memory 8a.

In the first image processing means 6a, the reference image $T_0$ and the comparative image $T_c$ are directly subjected to stereo matching without preprocessing. However, two images formed by preprocessing the reference image $T_0$ and the comparative image $T_c$ can be subjected to stereo matching in the first image processing means 6a, similarly to the second image processing means 6b that will be described below. In this case, two images preprocessed by different methods are input to each of the first image processing means 6a and the second image processing means 6b.

Figure 17:
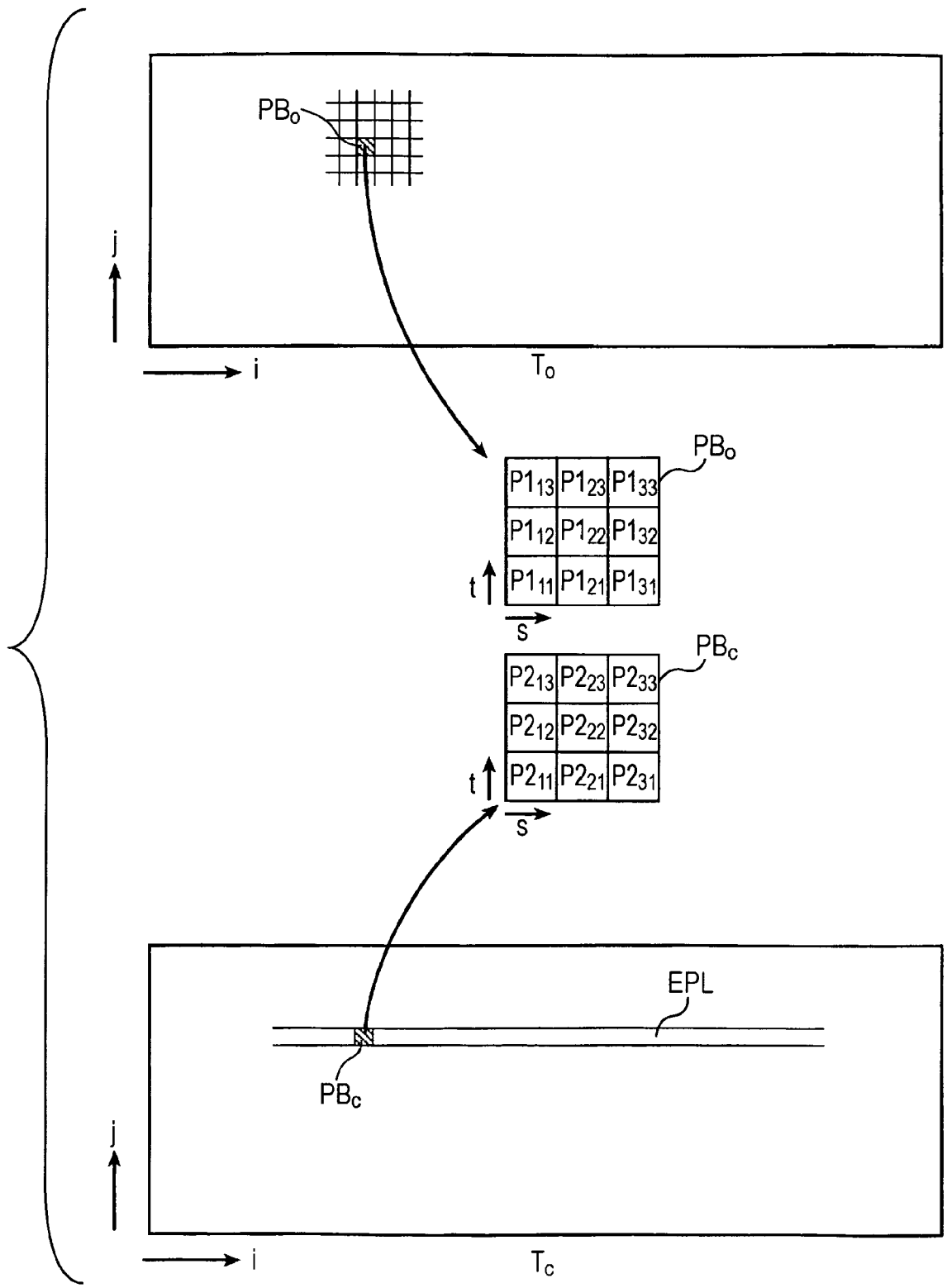
FIG. 17 explains how stereo matching is performed.

The first stereo matching means 7a performs stereo matching by the method shown in FIG. 17. More specifically, the first stereo matching means 7a sets a reference pixel block $PB_0$ defined by a predetermined number of pixels, such as 3 by 3 pixels or 4 by 4 pixels, in a reference image $T_0$, sets an epipolar line EPL at a vertical position in a comparative image $T_c$ corresponding to the reference pixel block $PB_0$, and searches for pixel blocks $PB_c$ in the comparative image $T_c$ while shifting the comparative pixel blocks $PB_c$ on the epipolar line EPL one pixel by one pixel, for example, from left to right. Then, the first stereo matching means 7a calculates SAD values according to Expression (1) described above, and specifies a pixel block $PB_c$ whose SAD value is less than or equal to a threshold value and is the smallest.

While the SAD value is thus used in this embodiment, for example, stereo matching can be performed on the basis of the sum of squares of the difference between a brightness value P1s,t of the pixel in the reference pixel block $PB_0$ and a brightness value p2s,t of the pixel in the comparative pixel block $PB_c$. Alternatively, stereo matching can be performed on the basis of differences calculated according to other expressions as long as the difference in the brightness pattern between the reference pixel block $PB_0$ and the comparative pixel block $PB_c$ can be calculated properly.

The first stereo matching means 7a also calculates first parallaxes dp1 from the positions of comparative pixel blocks $PB_c$ specified in the comparative image $T_c$ by stereo matching and the positions of original reference pixel blocks $PB_0$ in the reference image $T_0$. The above-described operations are performed for all reference pixel blocks $PB_0$ in the reference image $T_0$, and a first parallax dp1 is calculated for each reference pixel block $PB_0$.

Figure 3:
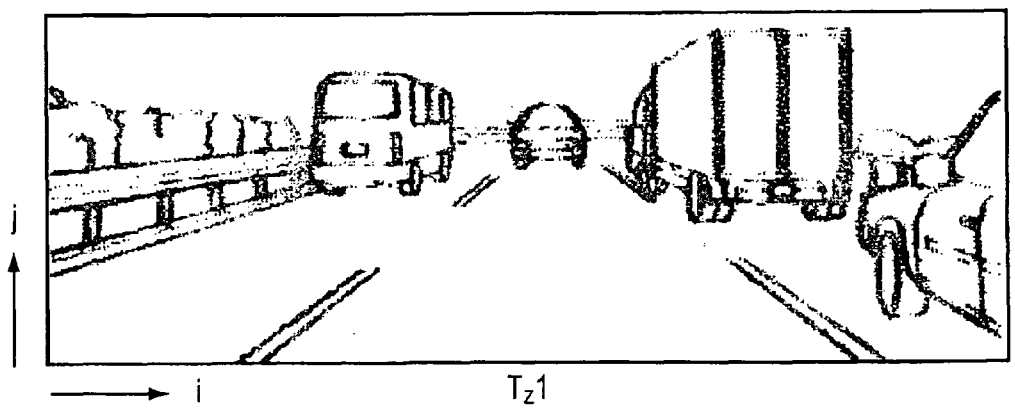
FIG. 3 shows a first distance image formed on the basis of the reference image shown in FIG. 2.

By assigning the calculated first parallaxes dp1 to the reference pixel blocks $PB_0$ in the reference image $T_0$, a first distance image $T_z1$ is formed, as shown in FIG. 3. In this way, the first stereo matching means 7a calculates the first parallaxes dp1 by stereo matching, and forms the first distance image $T_z1$.

The point $(X_1, Y_1, Z_1)$ in real space, the first parallax dp1, and the point $(i_1, j_1)$ in the first distance image $T_z1$ can be uniquely correlated by coordinate conversion given by the following Expressions (2) to (4) according to the principle of triangulation:

$$X_1 = CD/2 + Z_1 \times PW \times (i_1 - IV) \quad (2)$$

$$Y_1 = CH + Z_1 \times PW \times (j_1 - JV) \quad (3)$$

$$Z_1 = CD/(PW \times (dp1 - DP)) \quad (4)$$

where a point on the road surface just below the midpoint between the main camera 2a and the sub-camera 2b is designated as the origin, the X-axis indicates the width direction (right-left direction) of the subject vehicle, the Y-axis indicates the vehicle height direction, and the Z-axis indicates the vehicle length direction (front-rear direction).

In these expressions, CD represents the distance between the main camera 2a and the sub-camera 2b, PW represents the viewing angle for one pixel, CH represents the mounting height of the main camera 2a and the sub-camera 2b, IV and JV respectively represent i and j coordinates in the first distance image $T_z1$ of the point at infinity in front of the subject vehicle, and DP represents the vanishing point parallax.

Since the first parallax dp1 and the first distance $Z_1$ are uniquely correlated in this way, the first stereo matching means 7a can convert calculated first parallaxes dp1 into first distances $Z_1$ according to Expression (4) described above, and can form a first distance image $T_z1$ by assigning the first distances $Z_1$ to the pixel blocks $PB_0$ in the reference image $T_0$.

The first stereo matching means 7a stores information about the obtained first distance image $T_z1$ in the first distance-data memory 8a.

Figure 18A:
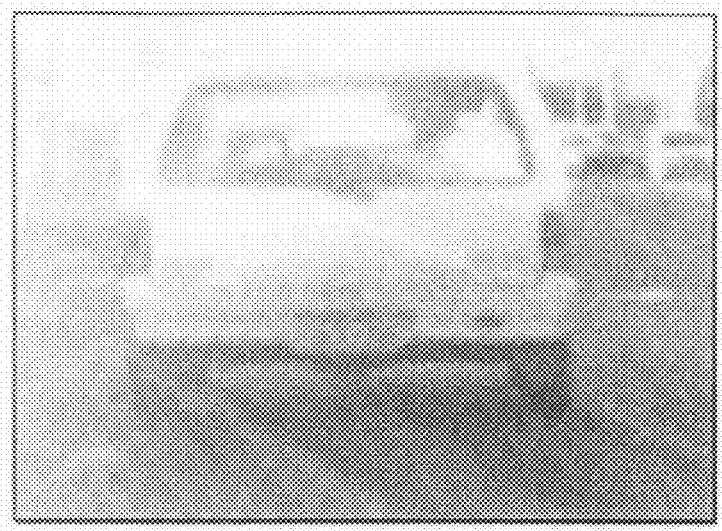
FIG. 18A is a photograph showing an example of a reference image.
Figure 18B:
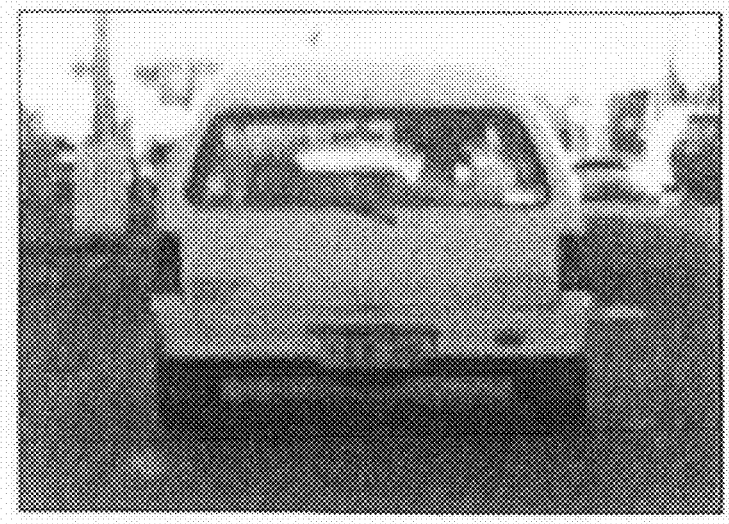
FIG. 18B is a photograph showing a comparative image that is totally darker than the reference image shown in FIG. 18A.
Figure 19:
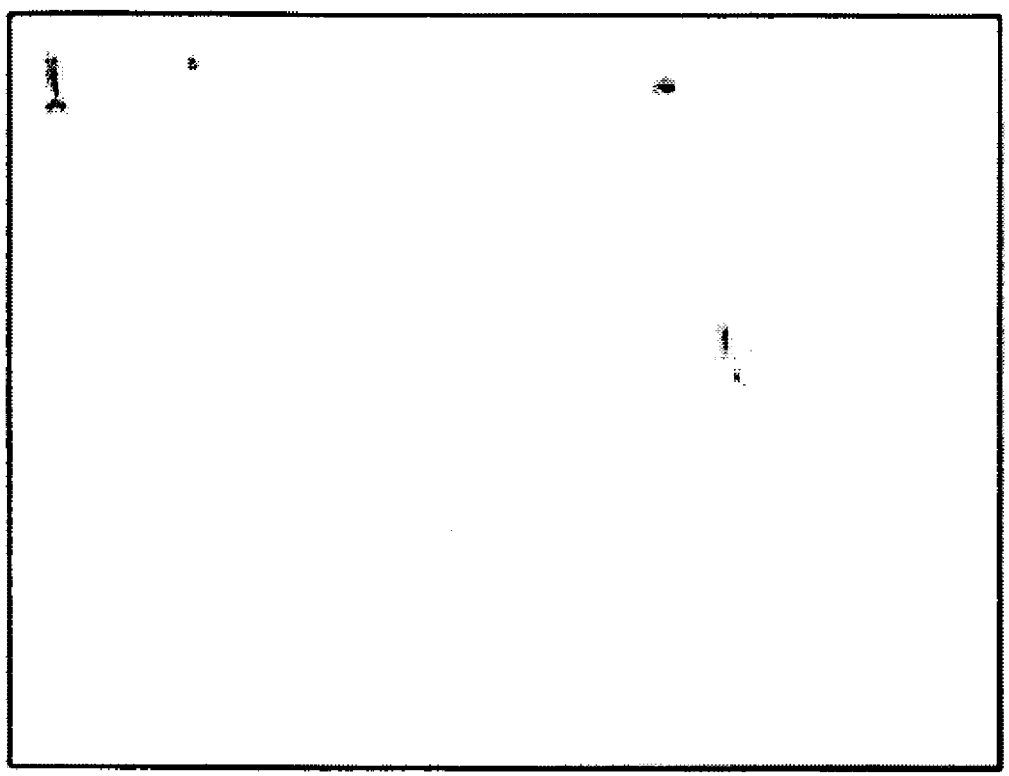
FIG. 19 is a photograph showing a distance image obtained by stereo matching of the reference image shown in FIG. 18A and the comparative image shown in FIG. 18B.

The first stereo matching means 7a forms a first distance image $T_z1$ shown in FIG. 19 in a scene in which a reference image $T_0$ shown in FIG. 18A and a comparative image $T_c$ shown in FIG. 18B are taken by the main camera 2a and the sub-camera 2b.

In contrast, two images formed by subjecting the reference image $T_0$ and the comparative image $T_c$ to predetermined processing by a preprocessing means 9 (see FIG. 1) are input to the second image processing means 6b.

In this embodiment, the preprocessing means 9 forms a reference edge image and a comparative edge image by subjecting the reference image $T_0$ and the comparative image $T_c$ to edge detection as the predetermined preprocessing.

After image correction such as displacement and noise removal, data on the brightnesses p1i,j and p2i,j of the pixels in the reference image $T_0$ and the comparative image $T_c$, are sequentially input from the image correction unit 4 to the preprocessing means 9 in every horizontal line, that is, every epipolar line having a width corresponding to one pixel in the reference image $T_0$ and the comparative image $T_c$. The brightnesses p1i,j and p2i,j represents the brightnesses of a pixel at the coordinates (i,j) in the reference image $T_O$ and the comparative image $T_c$.

The preprocessing means 9 performs edge detection by subjecting the data on the brightnesses p1i,j and p2i,j of the pixels input in every horizontal line in the reference image $T_O$ and the comparative image $T_c$ to filtering of a primary partial differential operator (−1/0/+1) (exactly, an operator double the primary partial differential operator (−0.5/0/+0.5).

In other words, the preprocessing means 9 conducts edge detection on the data on the brightnesses p1i,j and p2i,j of the pixels input in every horizontal line in the reference image $T_O$ according to the following Expression (5), and thereby forms a reference edge image $TE_O$ in which calculated edge values p3i,j are the brightnesses of the pixels at the coordinates (i,j):

$$p3i,j = -p1i-1,j + p1i+1,j \quad (5)$$

The preprocessing means 9 also conducts edge detection on the data on the brightnesses p2i,j of the pixels input in every horizontal line in the comparative image $T_c$ according to the following Expression (6), and thereby forms a comparative edge image $TE_c$ in which calculated edge values p4i,j are the brightnesses of the pixels at the coordinates (i,j):

$$P4i,j = -p2i-1,j + p2i+1,j \quad (6)$$

Figure 4A:
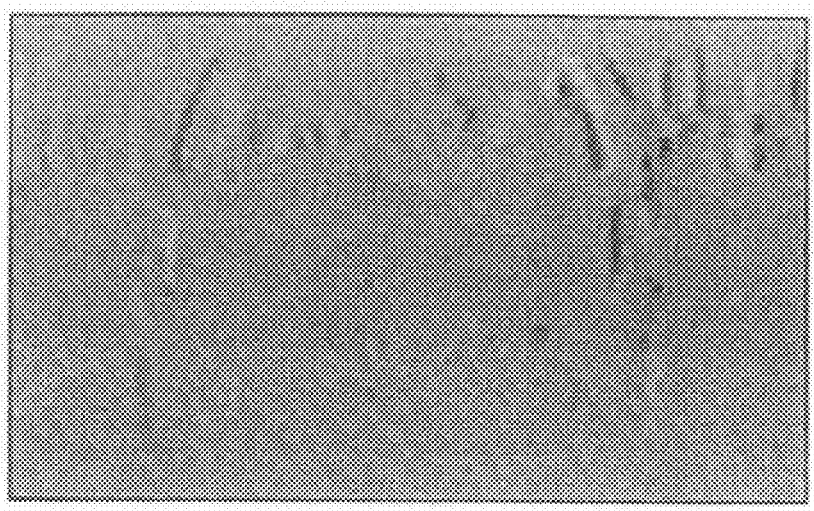
FIG. 4A is a photograph showing a reference edge image obtained from a reference image shown in FIG. 18A.
Figure 4B:
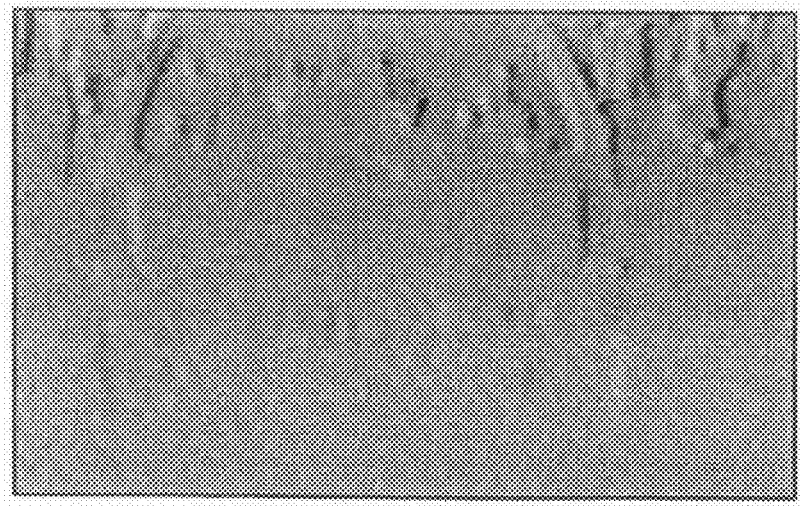
FIG. 4B is a photograph showing a comparative edge image obtained from a comparative image shown in FIG. 18B.

In the above-described scene in which a reference image $T_O$ shown in FIG. 18A and a reference image $T_c$ shown in FIG. 18B are taken by the main camera 2a and the sub-camera 2b, a reference edge image $TE_O$ shown in FIG. 4A and a comparative edge image $TE_c$ shown in FIG. 4B are obtained by edge detection of the preprocessing means 9.

In this way, the preprocessing means 9 forms the reference edge image $TE_O$ and the comparative edge image $TE_c$ defined by the pixels having the brightnesses (edge values) p3i,j and p4i,j, and transmits these images to the second image processing means 6b.

The second image processing means 6b has a configuration similar to that of the above-described first image processing means 6a. The second stereo matching means 7b in the second image processing means 6b also performs stereo matching by the method shown in FIG. 17. However, the second stereo matching means 7b conducts stereo matching on the reference edge image $TE_O$ and the comparative edge image $TE_c$.

Similarly to the first stereo matching means 7a, the second stereo matching means 7b calculates second parallaxes dp2 for pixel blocks in the reference edge image $TE_O$, and forms a second distance image $T_z2$ by assigning the calculated second parallaxes dp2 to the pixel blocks in the reference edge image $TE_O$.

Since the pixel blocks in the reference edge image $TE_O$ are set at the same pixel positions as those of the pixel blocks $PB_O$ that are set in the reference image $T_O$ by the first stereo matching means 7a, it can also be said that the second distance image $T_z2$ is formed by assigning the calculated second parallaxes dp2 to the pixel blocks $PB_O$ in the reference image $T_O$.

Figure 5:
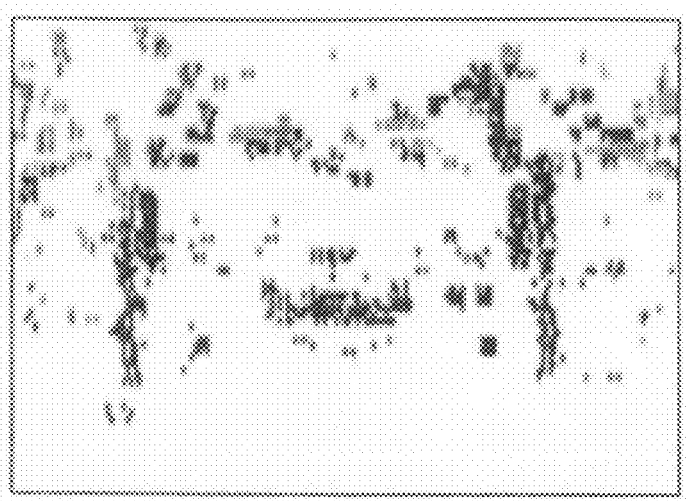
FIG. 5 is a photograph showing a second distance image formed on the basis of the reference edge image shown in FIG. 4A and the comparative edge image shown in FIG. 4B.

A second distance image $T_z2$ shown in FIG. 5 is formed on the basis of the reference edge image $TE_O$ shown in FIG. 4A and the comparative edge image $TE_c$ shown in FIG. 4B.

Similarly to the above, a point $(X_2, Y_2, Z_2)$ in real space calculated from the second parallax dp2, the second parallax dp2, and a point $(i_2, j_2)$ in the second distance image $T_z2$ can be uniquely correlated by coordinate conversion given by the following Expressions (7) to (9) according to the principle of triangulation:

$$X_2 = CD/2 + Z_2 \times PW \times (i_2 - IV) \quad (7)$$

$$Y_2 = CH + Z_2 \times PW \times (j_2 - JV) \quad (8)$$

$$Z_2 = CD/(PW \times (dp2 - DP)) \quad (9)$$

where the origin, the X-axis, the Y-axis, and the Z-axis are set similarly to the above, and CD represents the distance between the main camera 2a and the sub-camera 2b, similarly to the above.

Since the second parallax dp2 and the second distance $Z_2$ are uniquely correlated, the second stereo matching means 7b can convert the calculated second parallaxes dp2 into second distances $Z_2$ according to Expression (9) described above, and can form a second distance image $T_z2$ by assigning the second distances $Z_2$ to the pixel blocks $PB_O$ in the reference edge image $TE_O$ (reference image $T_O$).

The second stereo matching means 7b stores information about the second distance image $T_z2$ thus formed in the second distance-data memory 8b.

The recognition means 10 (see FIG. 1) is formed by a microcomputer in which a CPU, a ROM, a RAM, an input/output interface, etc. (not shown) are connected to a bus. Further, sensors Q, such as a vehicle-speed sensor, a yaw-rate sensor, and a steering-angle sensor for measuring the steering angle of the steering wheel, are connected to the recognition means 10. The yaw-rate sensor can be replaced with a device that estimates the yaw rate, for example, from the vehicle speed of the subject vehicle.

The recognition means 10 includes a detection means 11, a selection means 12, and a memory (not shown).

The detection means 11 detects objects in the reference image $T_O$ on the basis of the first distance image $T_z1$ and the second distance image $T_z2$ described above. In this embodiment, the detection means 11 is based on, for example, the vehicle surroundings monitoring apparatus disclosed in Japanese Unexamined Patent Application Publication No. 10-283461. Since detailed descriptions are given in the publication, the configuration of the detection means 11 will be briefly described below.

The detection means 11 performs object detection based on the first distance image $T_z1$ and object detection based on the second distance image $T_z2$ in the same processing manner. Therefore, it is assumed that a distance image $T_z$ shown in FIG. 6 is obtained as a first distance image $T_z1$ and a second distance image $T_z2$, and object detection based on the first distance image $T_z1$ and object detection based on the second distance image $T_z2$ will be collectively described below.

Figure 6:
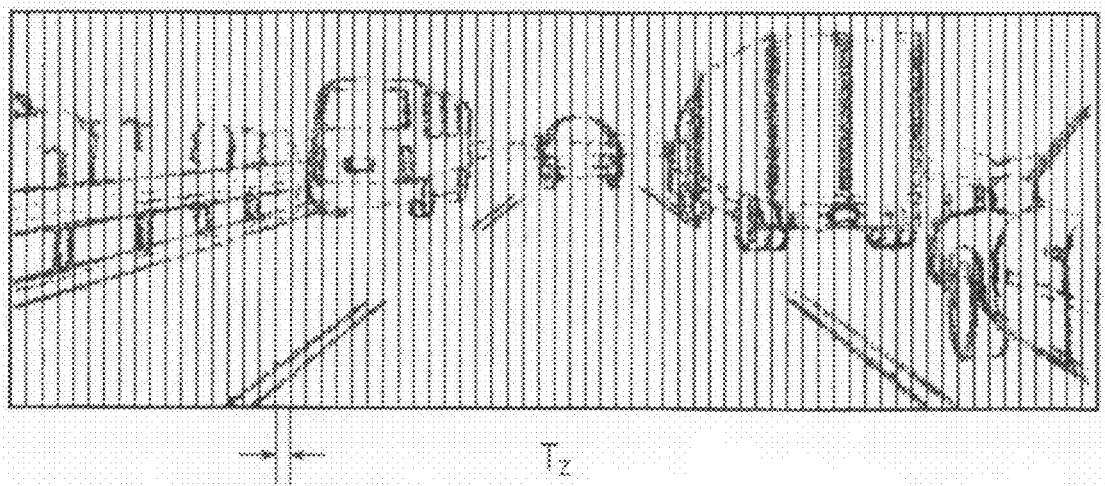
FIG. 6 illustrates strip sections of the distance image.
Figure 7:
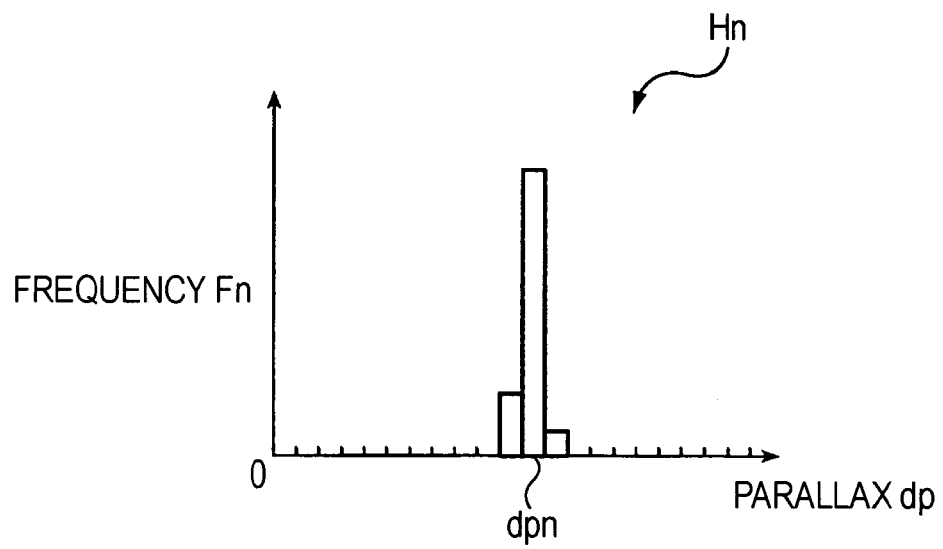
FIG. 7 illustrates a histogram formed for each section shown in FIG. 6.

The detection means 11 first reads out the distance image $T_z$ from the first distance-data memory 8a and the second distance-data memory 8b, and divides the distance image $T_z$ into vertical strip sections Dn each having a predetermined pixel width, as shown in FIG. 6. Then, the detection means 10 forms a histogram Hn for each strip section Dn, as shown in FIG. 7, and inputs parallaxes dp (first parallaxes dp1, second parallaxes dp2) belonging to the section Dn into the histogram Hn of the section Dn. A class having the highest frequency Fn is determined as an object parallax dpn of the strip section Dn. This operation is performed for all sections Dn in the first distance image $T_z1$ and the second distance image $T_z2$.

Figure 8:
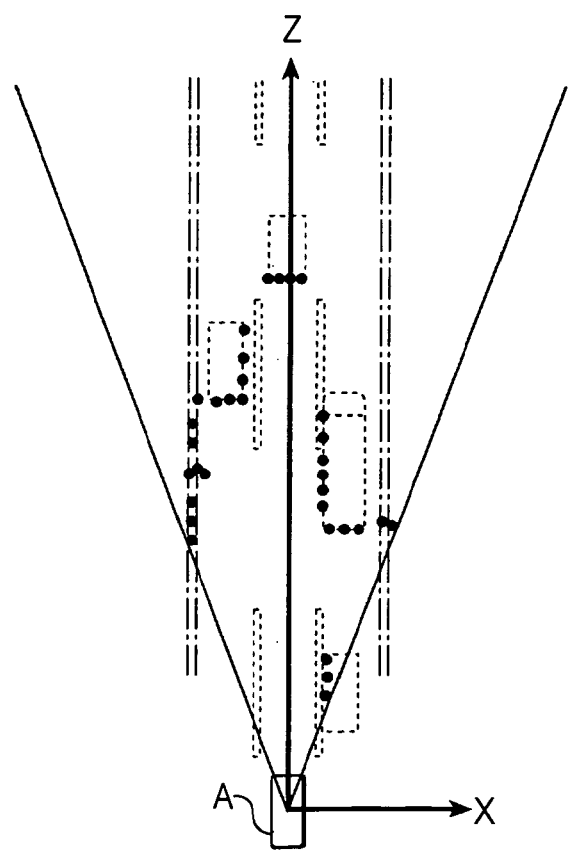
FIG. 8 shows dots formed by plotting distances in the sections in real space.
Figure 9:
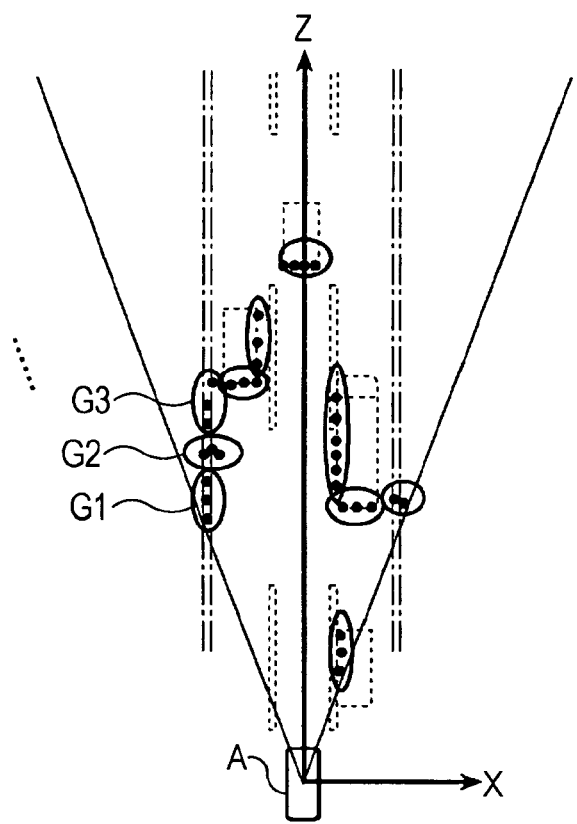
FIG. 9 shows groups obtained from the dots shown in FIG. 8.

Subsequently, the detection means 10 substitutes the parallaxes dpn of the sections Dn into dp1 and dp2 in the above Expressions (4) and (9), thus calculating distances Zn (first distances $Z_1$, second distances $Z_2$) of the sections Dn in real space corresponding to the parallaxes dpn. The calculated distances Zn are plotted in real space, as shown in FIG. 8, and adjacent plotted dots are classified into groups G1, G2, G3, . . . on the basis of the distances between the plotted dots and directionality, as shown in FIG. 9.

Figure 10:
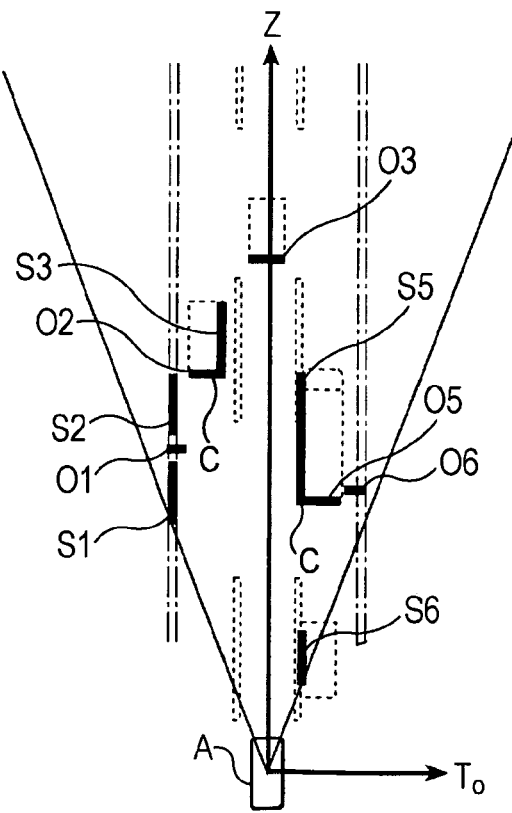
FIG. 10 shows examples of objects detected by linear approximation of the dots in the groups shown in FIG. 9.

In this embodiment, the detection means 11 linearly approximates the dots belonging to each group, as shown in FIG. 10. The detection means 11 labels a group, in which the dots are arranged substantially parallel to the width direction of the subject vehicle A, that is, the X-axis direction, with an "object" O, and labels a group, in which the dots are arranged substantially parallel to the length direction of the subject vehicle A, that is, the Z-axis direction, with a "side wall" S. A point that can be regarded as an intersection of an "object" and a "side wall" of the same object is labeled with C as a corner point.

In the example shown in FIG. 10, the detection means 11 detects, as one object, each of [Side Wall S1], [Object O1], [Side Wall S2], [Object O2, Corner Point C, Side Wall S3], [Side Wall S4], [Object O3], [Object O4], [Side Wall S5, Corner Point C, Object O5], [Object O6], and [Side Wall S6]. While "Object" and "Side Wall" are used as labels for convenience, as described above, "side wall" is also detected as an object.

Figure 11:
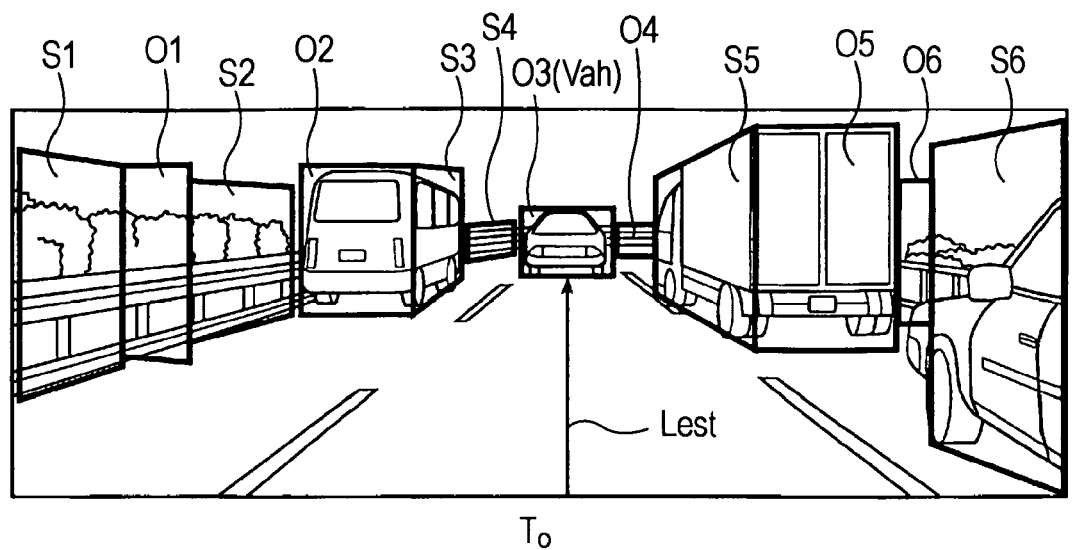
FIG. 11 shows detected objects enclosed by frames in the reference image.

The detection means 11 encloses the detected objects in rectangular frames in the reference image $T_O$, as shown in FIG. 11. In this way, the detection means 11 detects objects in the reference image $T_O$, and recognizes the environment around the subject vehicle A.

The detection means 11 performs the above-described operations for each of the first distance image $T_z1$ and the second distance image $T_z2$. For this reason, two results of detection of objects in the reference image $T_O$ are respectively obtained on the basis of the first distance image $T_z1$ and the second distance image $T_z2$.

In this embodiment, the detection means 11 also detects a preceding vehicle from the detected objects.

Figure 12:
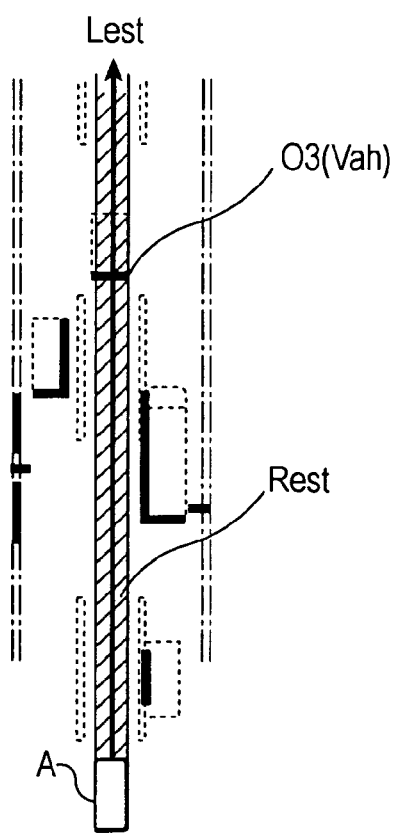
FIG. 12 shows a traveling locus and a traveling path of a subject vehicle and a preceding vehicle in real space.

More specifically, the detection means 11 first estimates, as a traveling locus Lest, a locus that the subject vehicle A will form during future driving, on the basis of the behavior of the subject vehicle A, as shown in FIG. 12. Then, the detection means 11 calculates, as a traveling path Rest of the subject vehicle A, a region that has a width equal to the width of the subject vehicle A and that includes the traveling locus Lest at the center thereof.

The traveling locus Lest of the subject vehicle A can be calculated from the turning curvature Cua of the subject vehicle A. The turning curvature Cua is calculated according to the following Expression (10) or the following Expressions (11) and (12) on the basis of the vehicle speed V and the yaw rate γ of the subject vehicle A, the steering angle δ of the steering wheel, etc:

$$Cua = \gamma/V \quad (10)$$

$$Re = (1 + Asf \cdot V^2) \cdot (Lwb/\delta) \quad (11)$$

$$Cua = 1/Re \quad (12)$$

where Re represents the turning radius, Asf represents the stability factor of the vehicle, and Lwb represents the wheel base.

The detection means 11 detects, as a preceding vehicle Vah traveling in front of the subject vehicle A, a vehicle closest to the subject vehicle A, of the vehicles existing on the traveling path Rest of the subject vehicle A. For example, a vehicle O3 is detected as a preceding vehicle Vah in FIGS. 11 and 12. The detection means 11 also calculates the lateral width of the preceding vehicle Vah in real space on the basis of the dots plotted in real space for the detected preceding vehicle Vah.

The detection means 11 performs the above-described operation of detecting the preceding vehicle Vah for each of the first distance image $T_z1$ and the second distance image $T_z2$. For this reason, two results of detection of the preceding vehicle Vah are respectively obtained on the basis of the first distance image $T_z1$ and the second distance image $T_z2$.

Further, the detection means 11 can detect the exchange between preceding vehicles, for example, when a detected preceding vehicle Vah comes out of the front of the subject vehicle A and a vehicle in front of the detected preceding vehicle Vah becomes a new preceding vehicle, or when another vehicle cuts in between the subject vehicle A and the preceding vehicle Vah so as to become a new preceding vehicle.

The selection means 12 selects one of the object detection result based on the first distance image $T_z1$ and the object detection result based on the second distance image $T_z2$ that are obtained by the detection means 11, as described above.

The selection means 12 performs selection on the basis of a specific object of the objects in the reference image $T_O$ detected by the detection means 11. In this embodiment, selection is performed on the basis of the preceding vehicle Vah. However, selection can be performed on the basis of vehicles other than the preceding vehicle Vah or other objects.

The selection means 12 rejects one or both of the object detection result based on the first distance image $T_z1$ and the object detection result based on the second distance image $T_z2$ under four conditions that will be described below. When none of the detection results are rejected, one of the results is selected under a fifth condition that will be described below. This selection under the fifth condition will be described in detail below.

In this embodiment, the selection means 12 pursues the preceding vehicle Vah with consistency, for example, by calculating the probability that a preceding vehicle detected in the previous sampling period and a vehicle detected in the current sampling period are the same three-dimensional object.

The selection means 12 stores information about objects and the preceding vehicle Vah in the detection result thus selected in the memory, and outputs the information from the vehicle environment recognition system 1, as necessary.

Operation of the vehicle environment recognition system 1 according to this embodiment will now be described.

As described above, the detection means 11 of the recognition means 10 in the vehicle environment recognition system 1 detects objects, including a preceding vehicle Vah, in the reference image $T_O$ on the basis of a first distance image $T_z1$ that is formed by subjecting a reference image $T_O$ and a comparative image $T_c$ taken by the stereo-image taking means 2 to stereo matching by the first stereo matching means 7a. The preceding vehicle Vah detected in this case is designated as a preceding vehicle Vah1.

Further, the detection means 11 detects objects, including a preceding vehicle Vah, in the reference image $T_O$ on the basis of a second distance image $T_z2$ that is formed by subjecting a reference edge image $TE_O$ and a comparative edge image $TE_c$ obtained by edge detection of the reference image $T_O$ and the comparative image $T_c$ taken by the stereo-image taking means 2, to stereo matching by the second stereo matching means 7b. The preceding vehicle Vah detected in this case is designated as a preceding vehicle Vah2.

Figure 2:
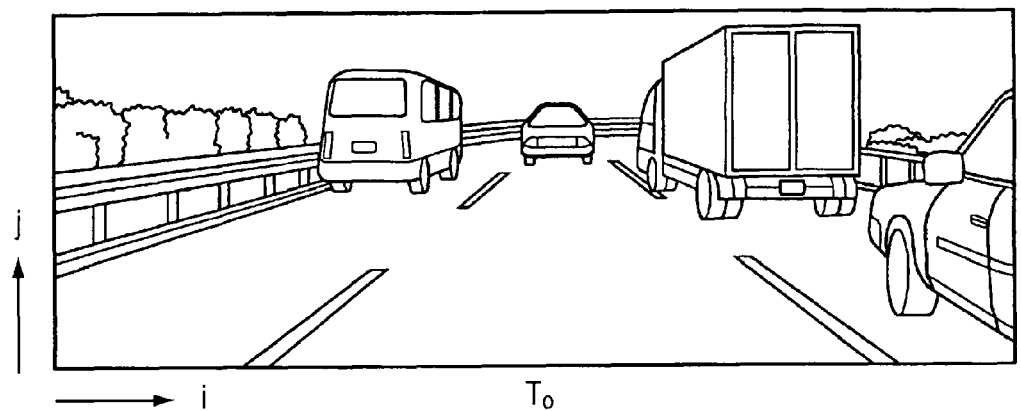
FIG. 2 shows an example of a reference image.

In a normal image taking environment, that is, in a normal state in which images of objects are taken in the reference image $T_O$ shown in FIG. 2 and the comparative image $T_c$, for example, in a sunny, cloudy, or rainy state or at night, the detection means 11 can accurately detect the preceding vehicle Vah and other objects in the reference image $T_O$ on the basis of the first distance image $T_z1$ and the second distance image $T_z2$, as shown in FIG. 11.

However, in an image taking environment in which backlight enters only one of the main camera 2a and the sub-camera 2b, as described above, the brightness balance between the main camera 2a and the sub-camera 2b is disturbed. For example, a brightness difference is generally formed between the reference image $T_0$ and the comparative image $T_c$, as shown in FIGS. 18A and 18B.

In this case, when the first stereo matching means 7a performs stereo matching using the reference image $T_0$ and the comparative image $T_c$, the SAD value calculated according to Expression (1) described above becomes a large value, but is not less than or equal to the threshold value. For this reason, a first distance image $T_z1$ having little data on the parallax dp is formed, as shown in FIG. 19. The detection means 11 cannot detect a preceding vehicle Vah (Vah1) on the basis of this first distance image $T_z1$.

In contrast, when the preprocessing means 9 (see FIG. 1) subjects the reference image $T_0$ and the comparative image $T_c$ shown in FIGS. 18A and 18B to edge detection, a reference edge image $TE_0$ shown in FIG. 4A and a comparative edge image $TE_c$ shown in FIG. 4B are obtained. When the second stereo matching means 7b performs stereo matching using the reference edge image $TE_0$ and the comparative edge image $TE_c$, a second distance image $T_z2$ in which edge portions of the preceding vehicle Vah are accurately extracted is formed, as shown in FIG. 5. The detection means 11 can accurately detect the preceding vehicle Vah (Vah2) on the basis of this second distance image $T_z2$.

In this way, stereo matching using the reference edge image $TE_0$ and the comparative edge image $TE_c$ can effectively detect a specific object, such as a preceding vehicle Vah, even when the brightness balance between the main camera 2a and the sub-camera 2b is disturbed, for example, by the influence of backlight. Unfortunately, this stereo matching has the following problems:

(a) Noise components in the reference image $T_0$ and the comparative image $T_c$ are amplified by edge detection. For this reason, for example, when the gain of the stereo-image taking means 2 is increased at night, noise components in the reference image $T_0$ and the comparative image $T_c$ are increased. Since the noise components are amplified by edge detection, mismatching may frequently occur in stereo matching.

(b) Information obtained by edge detection includes information about brightnesses of pixels in the reference image $T_0$ and the comparative image $T_c$ and information about differences in brightness between adjacent pixels in the same image or pixels adjacent thereto. Therefore, when the difference in brightness is 20 in the luminance levels of 0 to 255, it is unclear that the difference of 20 shows a change of the brightness from 100 to 120 or from 230 to 250. In other words, information about the offset amount of the brightness in each image is lost. Moreover, since the change in brightness only in a width corresponding to one or two pixels is found, information about a low-frequency component in the frequency component is lost.

Figure 13:
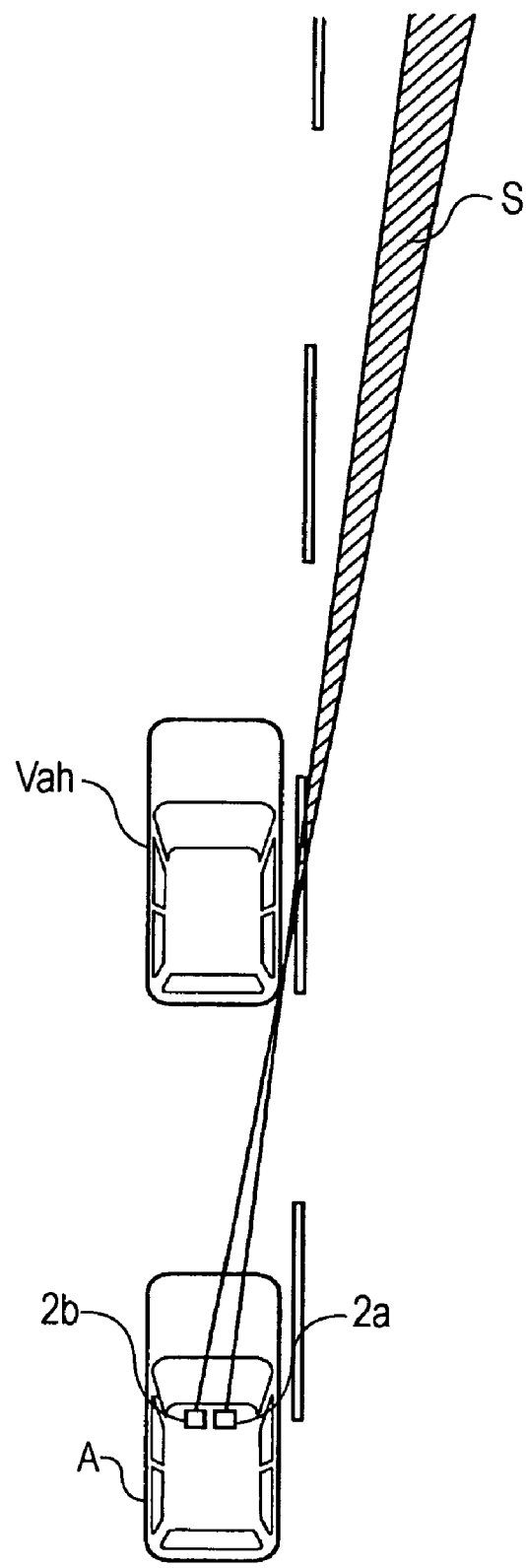
FIG. 13 shows a region hidden by the preceding vehicle in real space.

Consequently, mismatching easily occurs. As shown in FIG. 13, mismatching easily occurs particularly in a region S in which views from the main camera 2a and the sub-camera 2b in the subject vehicle A are different, for example, because the subject-vehicle A is hidden by the preceding vehicle Vah.

(c) Since the amount of information decreases, as described above, it is difficult to obtain effective information about a wall that is not characteristic in structure and pattern and an asphalt road surface.

Since stereo matching using the reference edge image $TE_0$ and the comparative edge image $TE_c$ has the above-described problems, it is better to always avoid detecting the preceding vehicle Vah by using only the second distance image $T_z2$. As described above, in a normal image-taking environment, the preceding vehicle Vah can be sufficiently and accurately detected by using the first distance image $T_z1$ that is formed by stereo matching based on the reference image $T_0$ and the comparative image $T_c$.

In this embodiment, in view of the above-described advantages and disadvantages of object detection using the first distance image $T_z1$ and object detection using the second distance image $T_z2$, the selection means 12 rejects one or both of the object detection result based on the first distance image $T_z1$ and the object detection result based on the second distance image $T_z2$ under the following four conditions. When none of the detection results are rejected, one of the results is selectively adopted according to the fifth condition.

First Condition

When the lateral width of the object (the preceding vehicle Vah in this embodiment) detected in the current object detection is smaller by at least a predetermined first threshold value TH1 than the lateral width of the object calculated on the basis of the detection result selected in the previous object detection, the current detection result is rejected.

In other words, for example, when the object detection result based on the first distance image $T_z1$ is selected in the previous object detection, the selection means 12 stores, in the memory, a lateral width Wold in real space of the preceding vehicle Vah1 detected by the detection means 11.

When a lateral width W1 in real space of the preceding vehicle Vah1 detected by the detection means 11 on the basis of the first distance image $T_z1$ in the current object detection is smaller by at least the first threshold value TH1 than the previous lateral width Wold, that is, when the following condition is satisfied, the selection means 12 rejects the current object detection result based on the first distance image $T_z1$:

$$Wold - W1 \geq TH1 \qquad (13)$$

This is because reliability of the object detection result based on the first distance image $T_z1$ is low in this case.

Similarly, when a lateral width W2 in real space of the preceding vehicle Vah2 detected by the detection means 11 on the basis of the second distance image $T_z2$ in the current object detection is smaller by at least the first threshold value TH1 than the previous lateral width Wold, that is, when the following condition is satisfied, the selection means 12 rejects the current object detection result based on the second distance image $T_z2$:

$$Wold - W2 \geq TH1 \qquad (14)$$

This is because reliability of the object detection result based on the second distance image $T_z2$ is low in this case.

Under the first condition, there are three cases, that is, a case in which both the object detection result based on the first distance image $T_z1$ and the object detection result based on the second distance image $T_z2$ are rejected, a case in which only one of the object detection results is rejected, and a case in which none of the object detection results are rejected.

Second Condition

When the distance from the currently detected object to the subject vehicle A changes by at least a predetermined second threshold value TH2 from the distance from the object to the subject vehicle A calculated on the basis of the detection result selected in the previous object detection, the current detection result is rejected.

In other words, for example, when the selection means 12 selects an object detection result based on the first distance image $T_z1$ in the previous object detection, it stores, in the memory, a first distance $Z_1$ from the preceding vehicle Vah1 to the subject vehicle A detected by the detection means 11, as a previous distance Zold.

In the current object detection, when the first distance $Z_1$ from the preceding vehicle Vah1 to the subject vehicle A detected by the detection means 11 on the basis of the first distance image $T_z1$ changes by at least the second threshold value TH2 from the previous distance Zold, that is, when the following condition is satisfied, the object detection result based on the first distance image $T_z1$ in the current object detection is rejected:

$$|Zold-Z_1| \geq TH2 \quad (15)$$

This is because reliability of the object detection result based on the first distance image $T_z1$ is low in this case.

Similarly, when a second distance $Z_2$ from the preceding vehicle Vah2 to the subject vehicle A detected by the detection means 11 based on the second distance image $T_z2$ in the current object detection changes by at least the second threshold value TH2 from the previous distance Zold, that is, when the following condition is satisfied, the selection means 12 rejects the object detection result based on the second distance image $T_z2$ in the current object detection:

$$|Zold-Z_2| \geq TH2 \quad (16)$$

This is because reliability of the object detection result based on the second distance image $T_z2$ is low in this case.

Under the second condition, there can also be three cases, that is, a case in which both the object detection result based on the first distance image $T_z1$ and the object detection result based on the second distance image $T_z2$ are rejected, a case in which only one of the object detection results is rejected, and a case in which none of the object detection results are rejected.

Third Condition

In a case in which an object detected at a position in the reference image $T_0$ in one of the object detection result based on the first distance image $T_z1$ and the object detection result based on the second distance image $T_z2$ is not detected at the position in the other detection result, when data on a number of parallaxes dp or distances Z more than or equal to a predetermined third threshold value TH3 do not exist at a position in the distance image where the object is detected in the one of the object detection result, both object detection results are rejected.

Figure 14:
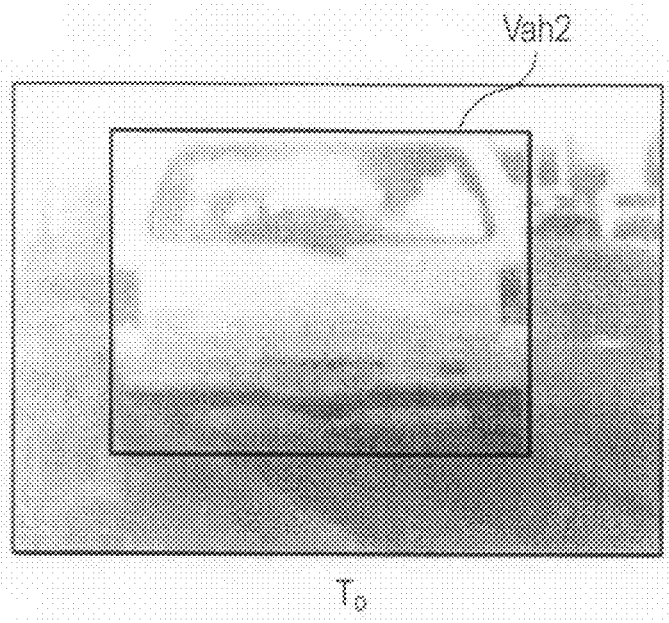
FIG. 14 is a photograph including a frame that encloses the preceding vehicle detected in the reference image shown in FIG. 18A.

That is, it is assumed that a second distance image $T_z2$ shown in FIG. 5 is obtained by object detection based on the reference edge image $TE_0$ and the comparative edge image $TE_c$ in the current object detection, and that a preceding vehicle Vah2 is detected in the reference image $T_0$ shown in FIG. 18A, as shown in FIG. 14. Further, it is assumed that a first distance image $T_z1$ shown in FIG. 19 is obtained by object detection based on the reference image $T_0$ and the comparative image $T_c$, and that a preceding vehicle Vah1 is not detected at a position in the reference image $T_0$ shown in FIG. 14 where the preceding vehicle Vah2 is detected.

Figure 15:
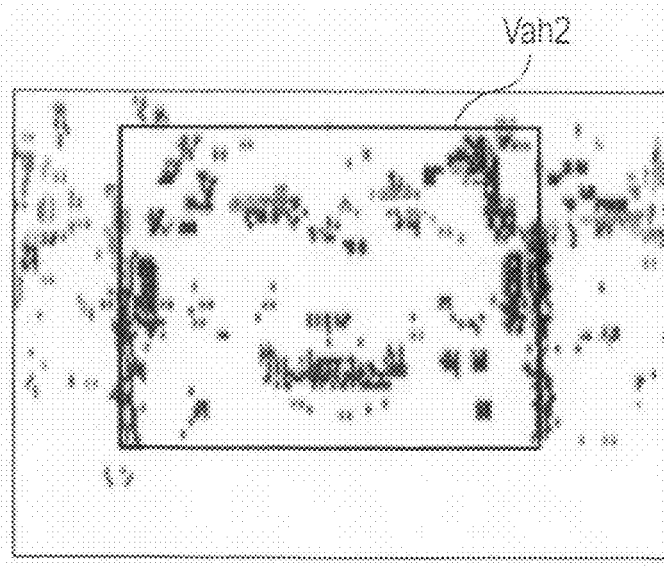
FIG. 15 is a photograph in which the frame shown in FIG. 14 is applied to the second distance image shown in FIG. 5.

In this case, the selection means 12 applies the detecting position (frame) of the preceding vehicle Vah2 shown in FIG. 14 into the second distance image $T_z2$, as shown in FIG. 15, and counts the number of second parallaxes dp2 existing as effective data in the frame (the number of second distances $Z_2$ when the second distance image $T_z2$ is formed by assigning the effective second distances $Z_2$).

When the number of effective second parallaxes dp2 (second distances $Z_2$) is more than or equal to the third threshold value TH3, only the object detection result based on the first distance image $T_z1$ is rejected, and the object detection result based on the second distance image $T_z2$ remains. When the number of effective second parallaxes dp2 (second distances $Z_2$) is less than the third threshold value TH3, both the object detection result based on the first distance image $T_z1$ and the object detection result based on the second distance image $T_z2$ are rejected.

The rejection is performed for the following reason. That is, even when an object (preceding vehicle Vah) is detected in only one of the detection results, if effective data on the parallaxes dp or the distances Z in the distance image $T_z$ serving as the base of detection is insufficient, reliability of information about the detected object is low.

Fourth Condition

In a case in which the first distance image $T_z1$ is formed on the basis of the reference image $T_0$ and the comparative image $T_c$, the second distance image $T_z2$ is formed on the basis of the reference edge image $TE_0$ and the comparative image $TE_c$, and the distance Z between the object and the subject vehicle A calculated from the first distance image $T_z1$ is less than the distance Z between the object and the subject vehicle A calculated from the second distance image $T_z2$, when the number of parallaxes dp or first distance data at the position where the object is detected in the first distance image $T_z1$ is less than a predetermined fourth threshold value TH4 and the number of parallaxes dp or data on the distance Z at the position where the object is detected in the second distance image $T_z2$ is more than a predetermined fifth threshold value TH5, the object detection result based on the first distance image $T_z1$ is rejected.

Figure 16A:
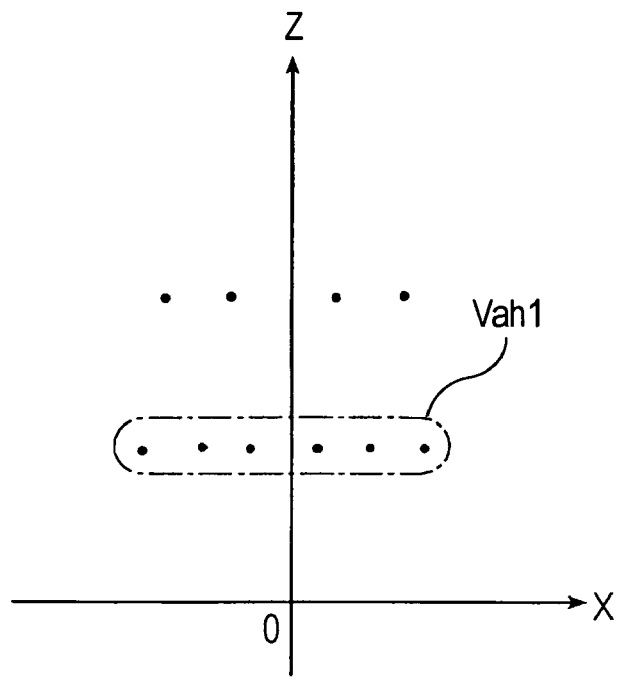
FIG. 16A shows a preceding vehicle detected at a position close to the origin.
Figure 16B:
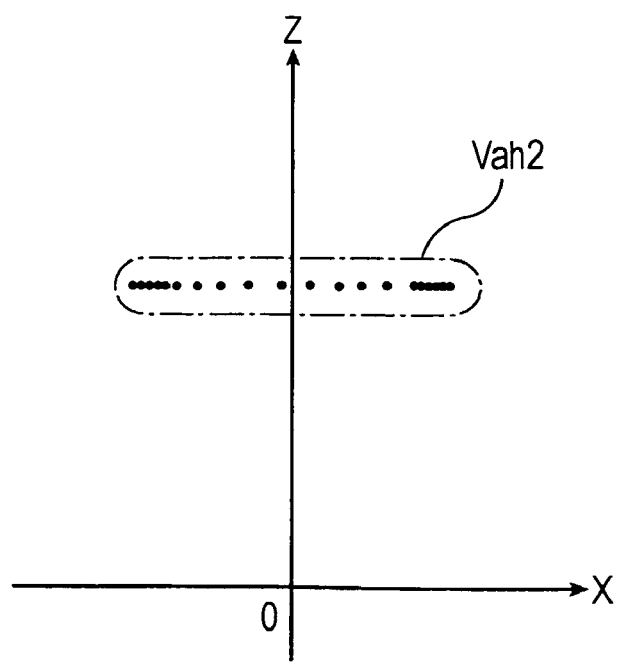
FIG. 16B shows a preceding vehicle detected at a position farther than the position shown in FIG. 16A.

When the first distance image $T_z1$ is formed on the basis of the reference image $T_0$ and the comparative image $T_c$ and the second distance image $T_z2$ is formed on the basis of the reference edge image $TE_0$ and the comparative edge image $TE_c$, the following phenomenon occurs rarely. As shown in FIGS. 16A and 16B, a preceding vehicle Vah1 detected from the first distance image $T_z1$ (FIG. 16A) is sometimes detected closer to the subject vehicle A at the origin O than a preceding vehicle Vah2 detected from the second distance image $T_z2$ (FIG. 16B).

In this case, similarly to the case shown in FIG. 15, the selection means 12 applies the detecting position (frame) of the preceding vehicle Vah2 into the second distance image $T_z2$, counts the number of second parallaxes dp2 existing as effective data in the frame (the number of second distances $Z_2$ when the second distance image $T_z2$ is formed by assigning effective second distances $Z_2$), and determines whether nor not the number of effective second parallaxes dp2 is more than the fifth threshold value TH5. When the number is less than or equal to the fifth threshold value TH5, the fifth condition is not applied, and the object detection result based on the first distance image $T_z1$ is not rejected.

When the number of effective second parallaxes dp2 is more than the fifth threshold value TH5, the selection means 12 similarly applies the detecting position of the preceding vehicle Vah1 into the first distance image $T_z1$, counts the number of first parallaxes dp1 existing as effective data in the frame (the number of first distances $Z_1$ when the first distance image $T_z1$ is formed by assigning effective first distances $Z_1$), and determines whether nor not the number of effective first parallaxes dp1 is less than the fourth threshold value TH4. When the number is more than or equal to the fourth threshold value TH4, the fifth condition is not applied, and the object detection result based on the first distance image $T_z1$ is not rejected.

The reason for the above is as follows: In a case in which the fourth condition is satisfied, if it is assumed that the object detection result based on the first distance image $T_z1$ is correct, it is consistent that an object, such as the preceding vehicle Vah, exists at a position close to the subject vehicle A, but edges of the object are detected farther than the position. Therefore, it is thought wrong to determine the object detection result based on the first distance image $T_z1$ in which the number of effective first parallaxes dp1 is small is correct.

Fifth Condition

When none of the object detection result based on the first distance image $T_z1$ and the object detection result based on the second distance image $T_z2$ are rejected under the first to fourth conditions described above, one of the detection results, in which the number of data on parallaxes dp or distances Z at the detecting position in the first distance image $T_z1$ or the second distance image $T_z2$ is smaller, is rejected.

In other words, when both the object detection result based on the first distance image $T_z1$ and the object detection result based on the second distance image $T_z2$ satisfy the first to fourth conditions, one of the detection results in which the number of data on effective parallaxes dp at the detecting position of the preceding vehicle Vah applied in the distance image $T_z$ (the number of distances Z when the distance image $T_z$ is formed by assigning effective distances Z) is larger, and the other detection result in which the number is smaller is rejected.

Instead of the fifth condition, for example, when the object detection using the first distance image $T_z1$ and the object detection using the second distance image $T_z2$ satisfy the first to fourth conditions described above, the object detection result using the first distance image $T_z1$ can be preferentially adopted, that is, the object detection result using the second distance image $T_z2$ can be rejected.

As described above, according to the vehicle environment recognition system 1 of this embodiment, in order to recognize an environment around a subject vehicle A by detecting images of objects in a reference image $T_0$, for example, two stereo matching means, that is, the first stereo matching means 7a for forming a first distance image $T_z1$ by stereo matching based on the reference image $T_0$ and a comparative image $T_c$ and the second stereo matching means 7b for forming a second distance image $T_z2$ by stereo matching means based on two images that are formed by subjecting the reference image $T_0$ and the comparative image $T_c$ to preprocessing such as edge detection, are provided. On the basis of the first and second distance images $T_z1$ and $T_z2$ formed by the different means, objects, such as a preceding vehicle Vah, are detected. The selection means 12 selects a proper detection result.

For this reason, in a case in which a reference image $T_0$ shown in FIG. 18A and a comparative image $T_c$ shown in FIG. 18B are used, even in an environment where objects, such as a preceding vehicle Vah, cannot be detected because the brightness balance between the cameras 2a and 2b is disturbed, objects can be accurately detected and the environment around the subject vehicle can be reliably recognized by using a distance image $T_z$ that is obtained by preprocessing and effective stereo matching with different stereo matching means.

Hence, in an environment where backlight enters only one of the cameras 2a and 2b, detection can be continued without losing the preceding vehicle Vah. This allows effective automatic follow-up control with respect to the preceding vehicle Vah.

Further, one of the detection results based on the first and second distance images $T_z1$ and $T_z2$ formed by different means, which satisfies the first to fifth conditions described above, is adopted. This can enhance the reliability of stereo matching of the vehicle environment recognition system 1 and of information about the objects detected by stereo matching.

While the reference image $T_0$ and the comparative image $T_c$ that are not preprocessed by the first stereo matching means 7a are subjected to stereo matching in the above-described embodiment, two images formed by preprocessing the reference image $T_0$ and the comparative image $T_c$ can be input to the first stereo matching means 7a. In this case, it is necessary to preprocess the reference image $T_0$ and the comparative image $T_c$ in different manners by the first stereo matching means 7a and the second stereo matching means 7b.

What is claimed is:

1. A vehicle environment recognition system comprising:
   stereo-image taking means for simultaneously taking images of an environment around a subject vehicle with a pair of cameras and for outputting the images as a reference image and a comparative image;
   first stereo matching means for calculating first parallaxes or first distances by stereo matching based on the reference image and the comparative image or based on two images formed by subjecting the reference image and the comparative image to a predetermined first preprocessing operation, and for forming a first distance image by assigning the calculated first parallaxes or first distances to pixel blocks in the reference image;
   second matching means for calculating second parallaxes or second distances by stereo matching based on two images formed by subjecting the reference image and the comparative image to a predetermined second preprocessing operation different from the first preprocessing operation, and for forming a second distance image by assigning the calculated second parallaxes or second distances to the pixel blocks in the reference image;
   detection means for detecting objects in the reference image on the basis of the first distance image and the second distance image; and
   selection means for selecting one of a result of detection of the objects based on the first distance image and a result of detection of the objects based on the second distance image.

2. The vehicle environment recognition system according to claim 1, wherein the selection means performs the selection on the basis of a specific object of the objects detected in the reference image by the detection means.

3. The vehicle environment recognition system according to claim 2, wherein the selection means compares a current lateral width of the specific object detected in a current object detection result with a previous lateral width of the specific object calculated on the basis of the object detection result selected in previous object detection, and rejects the current detection result when the current lateral width is smaller by at least a first predetermined threshold value than the previous lateral width.

4. The vehicle environment recognition system according to claim 2, wherein the selection means compares a current distance between the specific object and the subject vehicle that is detected in a current object detection result with a previous distance between the specific object and the subject vehicle that is calculated on the basis of the object detection result selected in previous object detection, and rejects the current object detection result when the current distance is different by at least a predetermined second threshold value from the previous distance.

5. The vehicle environment recognition system according to claim 2, wherein the selection means rejects both of the object detection result based on the first distance image and the object detection result based on the second distance image when the specific object is detected in one of the object detection results, and is not detected in the other object detection result at a detecting position in the reference image where the object is detected in the one detection result, and when the number of data on the first or second parallaxes or the first or second distances existing at the detecting position of the specific object in the first or second distance image in the one object detection result is less than a predetermined third threshold value.

6. The vehicle environment recognition system according to claim 2,
wherein the first stereo matching means forms the first distance image by performing the stereo matching based on the reference image and the comparative image, and
wherein the second stereo matching means forms the second distance image by performing the stereo matching based on two images that are formed by subjecting the reference image and the comparative image to edge detection as the second preprocessing operation.

7. The vehicle environment recognition system according to claim 6, wherein the selection means rejects the object detection result based on the first distance image when a distance between the specific object and the subject vehicle calculated on the basis of the first distance image is less than a distance between the specific object and the subject vehicle calculated on the basis of the second distance image, when the number of data on the first parallaxes or first distances at a detecting position of the specific object in the first distance image is less than a predetermined fourth threshold value, and when the number of data on the second parallaxes or second distances at a detecting position of the specific object in the second distance image is more than a predetermined fifth threshold value.

8. The vehicle environment recognition system according to claim 3, wherein, when none of the object detection result based on the first distance image and the object detection result based on the second distance image are rejected, the selection means rejects one of the object detection results including a smaller number of data on the first or second parallaxes or the first or second distances at a position where the specific object is detected in the first distance image or the second distance image.

* * * * *